(12) United States Patent
Motlag et al.

(10) Patent No.: US 12,430,788 B2
(45) Date of Patent: Sep. 30, 2025

(54) OBJECT LOCATION DETERMINATION

(71) Applicant: Micron Technology, Inc., Boise, ID (US)

(72) Inventors: Maithilee Motlag, Boise, ID (US); Hope Henry, Boise, ID (US); Nkiruka Christian, Bristow, VA (US); Chiara Cerafogli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 520 days.

(21) Appl. No.: 17/898,079

(22) Filed: Aug. 29, 2022

(65) Prior Publication Data

US 2024/0070893 A1 Feb. 29, 2024

(51) Int. Cl.
*G06T 7/70* (2017.01)
*G06T 1/60* (2006.01)
*G06V 10/44* (2022.01)
*G06V 10/74* (2022.01)

(52) U.S. Cl.
CPC .................. *G06T 7/70* (2017.01); *G06T 1/60* (2013.01); *G06V 10/44* (2022.01); *G06V 10/761* (2022.01); *G06V 2201/07* (2022.01)

(58) Field of Classification Search
CPC .. G06T 7/70; G06T 1/60; G06V 10/44; G06V 10/761; G06V 2201/07; G06V 10/70; G06V 20/20
See application file for complete search history.

(56) References Cited

U.S. PATENT DOCUMENTS

| | | | |
|---|---|---|---|
| 9,600,720 B1* | 3/2017 | Gray | G06F 18/25 |
| 10,157,332 B1* | 12/2018 | Gray | G06T 11/00 |
| 11,380,090 B2 | 7/2022 | Lee et al. | |
| 11,403,592 B2 | 8/2022 | Maeki et al. | |
| 2015/0213058 A1* | 7/2015 | Ambardekar | G06F 18/285 707/723 |
| 2019/0138851 A1* | 5/2019 | Gray | G06V 20/20 |
| 2020/0193206 A1* | 6/2020 | Turkelson | H04N 25/00 |
| 2022/0237417 A1 | 7/2022 | Singhal et al. | |
| 2022/0245712 A1 | 8/2022 | D'Souza et al. | |

* cited by examiner

*Primary Examiner* — Wassim Mahrouka
(74) *Attorney, Agent, or Firm* — Brooks, Cameron & Huebsch, PLLC

(57) ABSTRACT

Methods, apparatuses, and non-transitory machine-readable media associated with determining a location of an object are described. An object location determination can include receiving a user request associated with an object, receiving first signaling from a first image source, and receiving second signaling from a second image source. The object location determination can include writing data that is based at least in part on a combination of the user request, the first signaling, and the second signaling and determining a confidence level of identification of the object associated with the user request based on the user request, the first signaling, and the second signaling. The object location determination can include identifying output data representative of a location of the object based on the confidence level and transmitting the output data representative of the location of the object via third signaling.

20 Claims, 6 Drawing Sheets

OBJECT LOCATION DETERMINATION

TECHNICAL FIELD

The present disclosure relates generally to apparatuses, non-transitory machine-readable media, and methods associated with determining a location of an object, including the use of machine learning.

BACKGROUND

Memory resources are typically provided as internal, semiconductor, integrated circuits in computers or other electronic systems. There are many different types of memory, including volatile and non-volatile memory. Volatile memory can require power to maintain its data (e.g., host data, error data, etc.). Volatile memory can include random access memory (RAM), dynamic random-access memory (DRAM), static random-access memory (SRAM), synchronous dynamic random-access memory (SDRAM), and thyristor random access memory (TRAM), among other types. Non-volatile memory can provide persistent data by retaining stored data when not powered. Non-volatile memory can include NAND flash memory, NOR flash memory, and resistance variable memory, such as phase change random access memory (PCRAM) and resistive random-access memory (RRAM), ferroelectric random-access memory (FeRAM), and magnetoresistive random access memory (MRAM), such as spin torque transfer random access memory (STT RAM), among other types.

Electronic systems often include a number of processing resources (e.g., one or more processing resources), which may retrieve instructions from a suitable location and execute the instructions and/or store results of the executed instructions to a suitable location (e.g., the memory resources). A processing resource can include a number of functional units such as arithmetic logic unit (ALU) circuitry, floating point unit (FPU) circuitry, and a combinatorial logic block, for example, which can be used to execute instructions by performing logical operations such as AND, OR, NOT, NAND, NOR, and XOR, and invert (e.g., NOT) logical operations on data (e.g., one or more operands). For example, functional unit circuitry may be used to perform arithmetic operations such as addition, subtraction, multiplication, and division on operands via a number of operations.

Artificial intelligence (AI) can be used in conjunction memory resources. AI can include a controller, computing device, or other system to perform a task that normally requires human intelligence. AI can include the use of one or more machine learning models. As described herein, the term "machine learning" refers to a process by which a computing device is able to improve its own performance through iterations by continuously incorporating new data into an existing statistical model. Machine learning can facilitate automatic learning for computing devices without human intervention or assistance and adjust actions accordingly.

DETAILED DESCRIPTION

Figure 1:
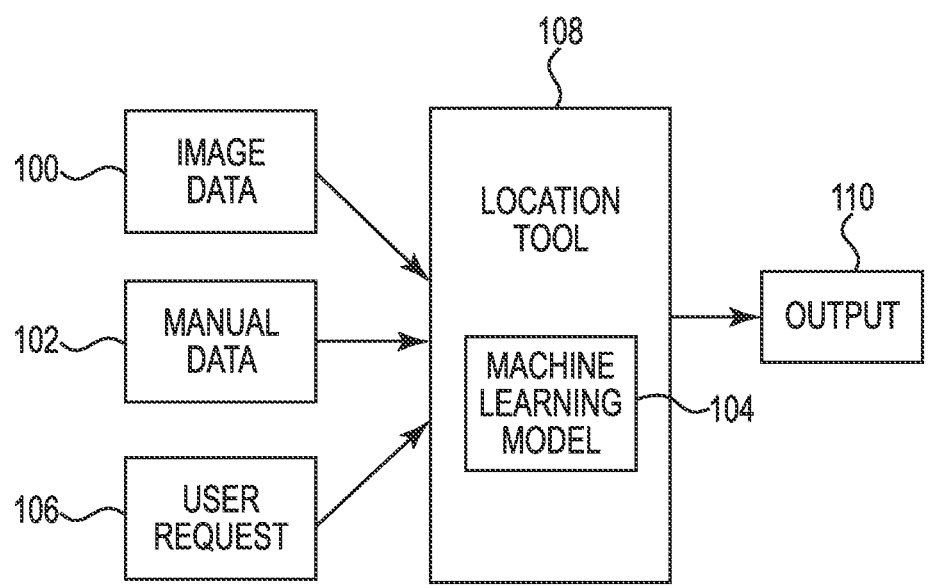
FIG. 1 is a functional diagram representing a system for object location determination in accordance with a number of embodiments of the present disclosure.

Systems, devices, and methods related to an object location determination are described. Locating objects such as instruments or tools in large or complex spaces such as laboratories, shelving, storage spaces, etc. can be challenging and time-consuming. For instance, in a laboratory, time may be wasted searching for a particular tool instead of working on a project. Layouts of such storage or other areas may be non-sensical or non-logical, creating an additional challenge to finding a desired object. Additionally, check-in and check-out procedures may exist for some objects, but not for others, adding more difficulty to locating particular objects.

Examples of the present disclosure can allow for object location determinations that is visual-based and dynamic. For instance, examples of the present disclosure can utilize AI and an associated machine learning model to process images and recognize object features to determine a location of a desired object while allowing for objects to be added or removed to the area being searched without disrupting location determinations or manual logging (e.g., check-in, check-out procedures). Such examples can also allow for reorganization of objects without disrupting location determinations or manual logging. As user may also be able to view the object in the location being searched using augmented reality (AR) via a mobile device, for example.

Utilizing AR, in some instances, can include the user viewing his or her physical environment along with AR via smart glass (e.g., viewing the AR via smart glasses), viewing AR via a display of a computing device (e.g., a smartphone display, tablet display, personal computer display, etc.), or viewing AR via a headset, among others. The AR may appear to be an avatar or other non-real items displayed within the real world. For instance, a user may see a row of shelves with several objects, which are actually present on the shelves, but they may also view an avatar representing the user or an arrow indicating a location of an object. Neither the avatar nor the arrow is present in the real world.

Put another way, utilizing the AR can result in the physical location of the user being viewable, and the user can view a rendering of digital images or data onto real-world objects. For instance, superimposed digital information can be overlaid on the user's view of a physical environment. The digital information can be tailored to the user's physical position and context of the task (e.g., determining a location, tracking movement, etc.), thereby helping the user to complete the task. Unlike virtual reality, AR is not a simulation of reality, rather it integrates and adds to a user's interaction with the real world.

Examples of the present disclosure can include a method for determining a location of an object. The method can include receiving, at a first processing resource, a user request associated with an object, receiving, at the first processing resource, first signaling from a first image source, and receiving, at the first processing resource, second signaling from a second image source. The method can also include writing from the first processing resource to a memory resource coupled to the first processing resource, data that is based at least in part on a combination of the user request, the first signaling, and the second signaling and determining, at the first processing resource or a different, second processing resource, a confidence level of identification of the object associated with the user request based on the user request, the first signaling, and the second signaling.

In some examples, the method can include identifying, at the first processing resource or the different, second processing resource, output data representative of a location of the object based on the confidence level and transmitting the output data representative of the location of the object via third signaling.

Signaling can be received from a radio or radios in communication with a processing resource or processing resource configured to perform particular tasks (e.g., receive user requests, retrieve and/or receive image data, etc.). As used herein, the use of a radio can include the transmission and/or reception of information through intervening media (e.g., air, space, nonconducting materials, etc.). This can include, for instance, radio waves or other wireless communication and/or signaling including but not limited to cellular communication, one-way communication, two-way communication, radar, radiolocation, radio remote control, satellite communication, Wi-Fi, 3G, 4G, 5G, and/or other communication standards, among others. In some examples, the use of a radio can include wired transmission and/or reception of information.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For example, 450 can reference element "50" in FIG. 4, and a similar element can be referenced as 550 in FIG. 5. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional diagram representing a system for object location determination in accordance with a number of embodiments of the present disclosure. The system can include a location tool 108 that uses a machine learning model 104 or models to determine an object location, missing object, or both. For instance, the location tool 108 can determine where an object is located with a particular confidence level. Based on that confidence level, a location can be presented to a user, or an indication that the object cannot be found with a high enough confidence level can be communicated to the user.

The location tool 108 can include, for instance, a machine learning model 104 such as a tabular data machine learning model (e.g., tree-based machine learning model) that performs multi-class classification on tabular data (e.g. numerical data, categorical data, etc.), an image data machine learning model 109-2 (e.g., a convolution neural network machine learning model) to perform multi-class classification on image data (e.g., videos, images, video clips, image sequences, etc.), or both. Other machine learning models 104 and/or combinations thereof may be part of the location tool 108. The location tool 108 can include, in some examples, a processing resource in communication with a memory resource that utilizes AI (including the machine learning model 104) to determine an object location, a missing object, or both. Put another way, the location tool 108 and associated AI determines a location of an object (e.g., displays a location on a device) or determines the object cannot be located and/or provides suggestions associated with locating the object (gather more images, check for other features, etc.) based on data available to the location tool 108 including, but not limited to, image data, manual data, and user requests.

The location tool 108 and associated AI (e.g., including machine learning model 104) can be trained using a training dataset or training datasets. For instance, a training dataset can include a set of examples used to fit parameters of the AI. For instance, the training dataset for the machine learning model 104 (or models) can include data associated with image data from a plurality of sources including, for example, an image database including object images, an object feature image database including object features and/or images of object features, still images of locations, video data of locations, image sequence data from video data, or a combination thereof. The image database may be local to a device or may be cloud-based, in some examples.

The training dataset can also include data associated with manual data, such as object data (e.g., unique features, colors, etc.) or location data manually entered into the tool or a database associated therewith, and user requests for object locations. In some examples, the location tool 108 and associated machine learning model 104 can also be trained using new input data (e.g., new data from databases, users, research data, etc., among others). In some examples, the location tool 108 and associated trained machine learning model 104 can include continuous learning of the machine learning model 104 and re-calibration of the machine learning model 104.

The location tool 108 can receive input data from a plurality of sources. The input data can be encrypted, in some examples. Sources can include an image database, an object feature database, cameras (e.g., still and/or video), mobile applications (e.g., user requests via mobile applications), and manual input, among others. For instance, the image database may include images of objects, while the object feature database may include features of the objects (e.g., extracted from the image database). The image database and/or the object feature database may be local to a device or may be cloud-based, in some examples.

At 100, image data can be monitored and collected. In some examples, image data associated with a plurality of objects can be stored in an image database, and features of those images can be extracted and stored in an object feature database. For instance, if a user is searching for an object in a laboratory, image data associated with objects commonly found in a similar laboratory are stored in the image database, and the location tool 108 or another tool can extract features from that image data to store in an object feature database.

In some examples, image data can include data received from cameras such as security cameras or cameras installed in a location to track objects. For instance, a laboratory may include a stationary camera to discourage workers from removing items from the laboratory and/or to take periodic photos of the location for use in locating a desired object. Image data, in some instances, may be gathered from other devices such as a mobile device (e.g., tablet, smartphone, etc.), and the images gathered can be used to aid in locating the desired object.

At 102, manual input can be received. This can include any of the aforementioned image data or other data associated with the location (e.g., heavy objects are stored on bottom shelves), but may be provided in a manual matter, for instance, via a mobile application or other data entry system. Manual input can also include uploaded historical photographs and videos (e.g., example objects previously used or searched for, etc.).

At 106, a user request can be received. For instance, a user may desire to find a particular object in a laboratory (e.g., a screwdriver). The user can request the object, for instance via a mobile application or other data entry tool, and the location tool 108 can receive the request and utilize the machine learning model 104 and other input data to determine a location of the item or determine that the location cannot be found with a desired confidence.

The location tool 108 can consider the data received to determine a most likely location of the object. For instance, the location tool 108 includes the machine learning model 104 (or models), which can be used to determine an output at 110 where an object is location, a confidence level associated with that location, a non-location (e.g., the object was not located), and/or suggestions to improve the confidence level or find the object. In some examples, the output data, at 110, can include an AR display of the location of the object (e.g., via a display of a computing device), and/or text to the device with pertinent information associated with the object's location (e.g., confidence level, suggestions, text description of the location, etc.).

In some examples, different sources and associated data may be assigned different weights within the location tool 108. For instance, a source determined to provide data more likely to help to determine a location of an object with higher confidence may be given more weight than a source determined to provide data less likely to aid in locating an object. In some instance, inputs can carry the same weights. The machine learning model 104 can classify the data received and provide an output in the form of a likely location (or non-location) of the object.

Figure 2:
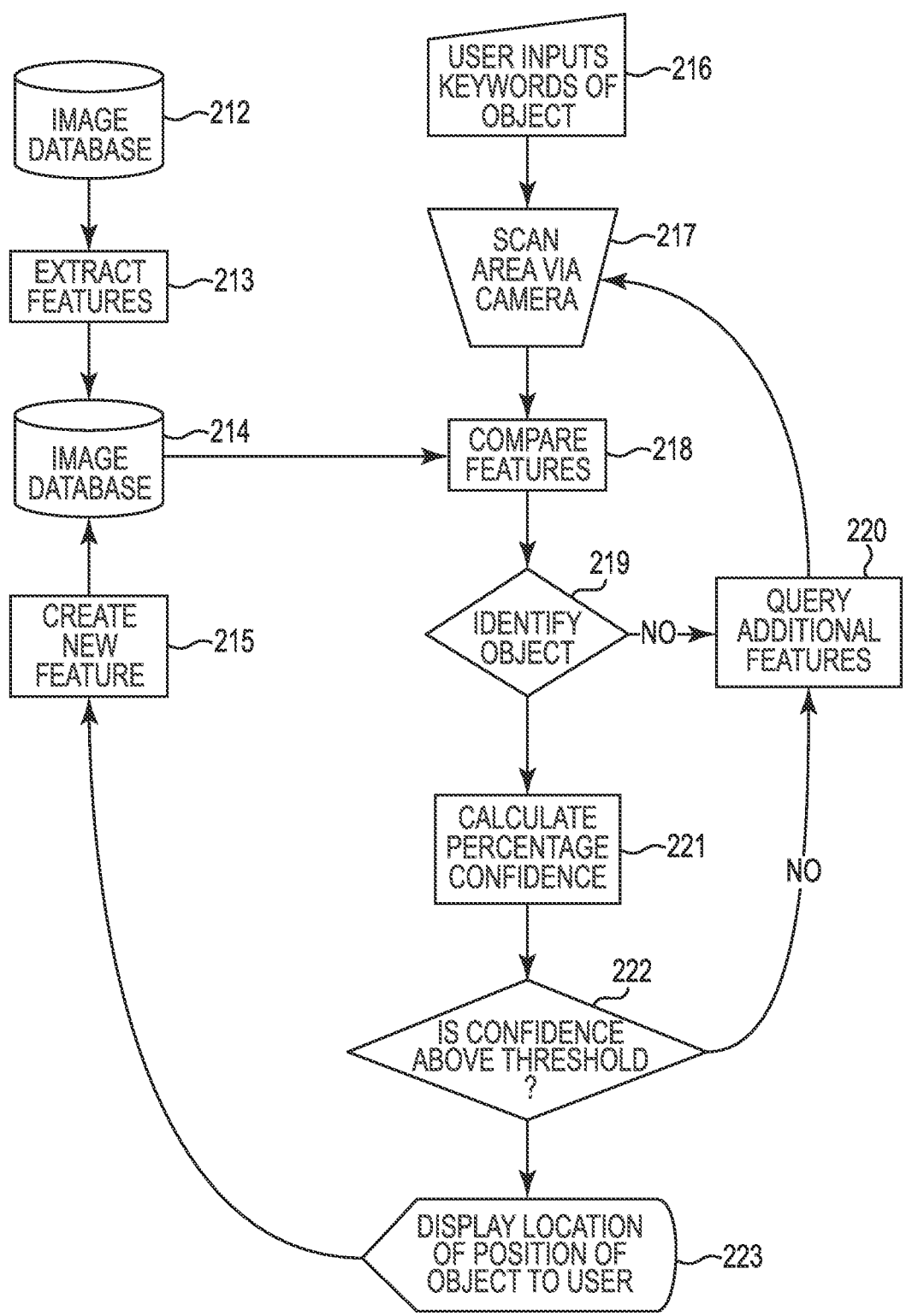
FIG. 2 is a flow diagram representing an example method for object location determination in accordance with a number of embodiments of the present disclosure.

FIG. 2 is a flow diagram representing an example method for object location determination in accordance with a number of embodiments of the present disclosure. The example method may be performed, in some examples, using a location tool 108 and/or a device such as those described with respect to FIGS. 4 and 5. At 216, user input is received at a device. For instance, a user searching for a particular pliers in a laboratory may enter information (e.g., keyword, name, description, image, etc.) into a device, for instance via an application. The area to be searched can be scanned by a camera at 217. This scanning can be performed by the user scanning the area with a device having a camera (e.g., smartphone, tablet, etc.), can be scanned by a stationary camera (e.g., a security camera) continuously or periodically, or both. In some examples, image sequences or individual images can be captured from the stationary camera. For instance, this may be useful when objects are moved around in the location to be searched (e.g., tools not put back on proper shelf), such that the object can be found even if it is moved.

Figure 4:
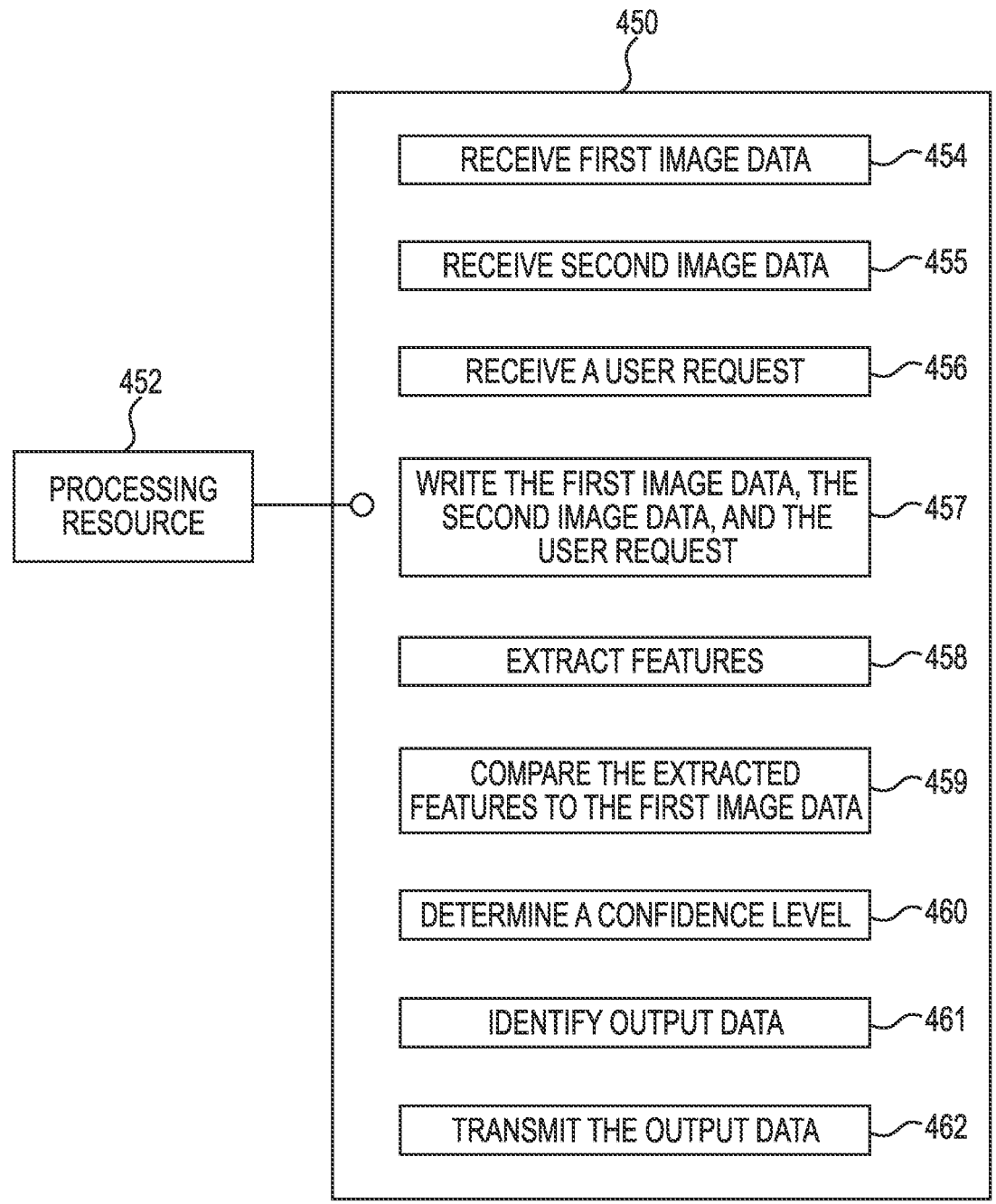
FIG. 4 is another functional diagram representing a processing resource in communication with a memory resource having instructions written thereon in accordance with a number of embodiments of the present disclosure.
Figure 5:
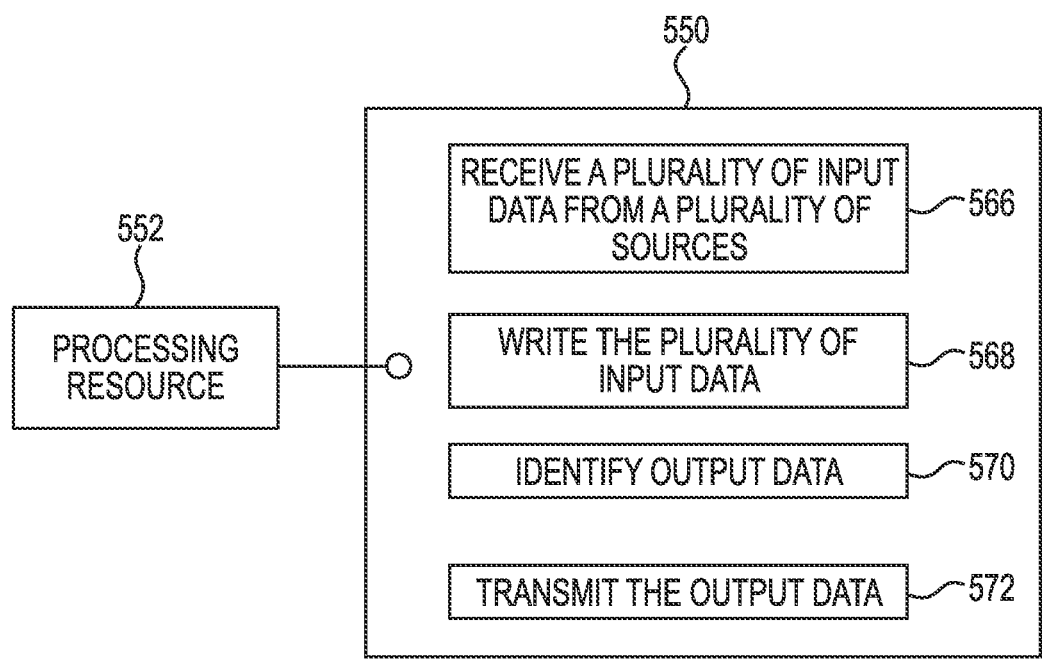
FIG. 5 is yet another functional diagram representing a processing resource in communication with a memory resource having instructions written thereon in accordance with a number of embodiments of the present disclosure.

At 212, a location tool and/or a device such as those described with respect to FIGS. 4 and 5 can receive images from an image database. The image database can include images of objects that may be found in the particular location to be searched. The images may be manually entered into the database, may have been previously collected in searches, or may be added to the database in other manners. For instance, the image database in a grocery store may include images of different groceries, healthcare items, or other objects likely to be found in a grocery store. In a laboratory, the image database may include images of tools, equipment, etc. Based on the location to be searched the image database can include relevant images, and the database can be updated as needed or desired.

At 213, features from the images can be extracted. For instance, some features of different types of pliers may be different, but some may be the same or similar. Features such as the shape of a needle-nose pliers vs. a locking pliers may be different, while features such as material may be the same. These different features of the objects can be extracted to aid in identifying objects and determining locations thereof.

At 214, an object feature database can be created based on the image database and the extract features of the images. The object feature database, for instance, can include features extracted from objects that may be found in the location to be searched. The object feature database may be updated depending on results of searches, for instance if results were poor and indicated more features were needed to identify and/or find the object. The object feature database can be updated manually or in response to requests/queries for more information based on low (e.g., below threshold) search result confidence levels. For instance, if a user is not happy with the results of the search, the user can provide feedback, and the object feature database and/or the machine learning model can be updated.

At 218, features of the desired object, for instance as determined based on keywords, etc. entered by the user can be compared to the object feature database. For example, if the user enters "screwdriver," features of a screwdriver can be compared to features of screwdrivers extracted from the image database to the object feature database.

At 219, the object can be identified based on the comparison of the features. If the object cannot be identified based on the keyboard, a query can be made request more features at 220. For instance, if no object is identified, the user can be alerted to enter more specific data associated with the object and/or re-scan the location using a camera. If a still camera is used, instructions can be sent to re-scan and/or collect more images of the location.

If the object is identified based on the comparison, a confidence level of that identification can be determined at 221. For instance, using AI and an associated machine learning model or models, a confidence level (e.g., percentage) that the object desired by the user matches an object located during an image scan can be determined. The confidence level may be based on how many features match, how closely the features match, lack of matching features, etc. A threshold confidence level can be set by a user, or a default threshold level may be used.

If the confidence level is below the threshold confidence level at 222, the location tool can request additional features or information associated with the desired object or objects being searched in the location and found in the image database and/or features found in the object feature database. If the confidence level is at or above the threshold confidence level, the location of the object can be displayed to the user at 223. For instance, the location can be displayed via a user interface such as a smart device screen. In an example, as user views the object as AR via the screen in the location searched.

Once the object is located, a new feature can be created at 215 and added to the object feature database for use in future searches. For instance, if a user searched for a needle-nose pliers and found one that had a red handle, the red handle feature may be added to the object feature database to improve future searches. If, for instance, a needle-nose pliers is found, but it is not the desired needle-nose pliers, the feature database may be updated to include a distinguishing feature between the desired pliers and the similar, but undesired pliers. This can be done manually, or the machine learning model can be updated as it learns while it continues to search and gather results.

Figure 3:
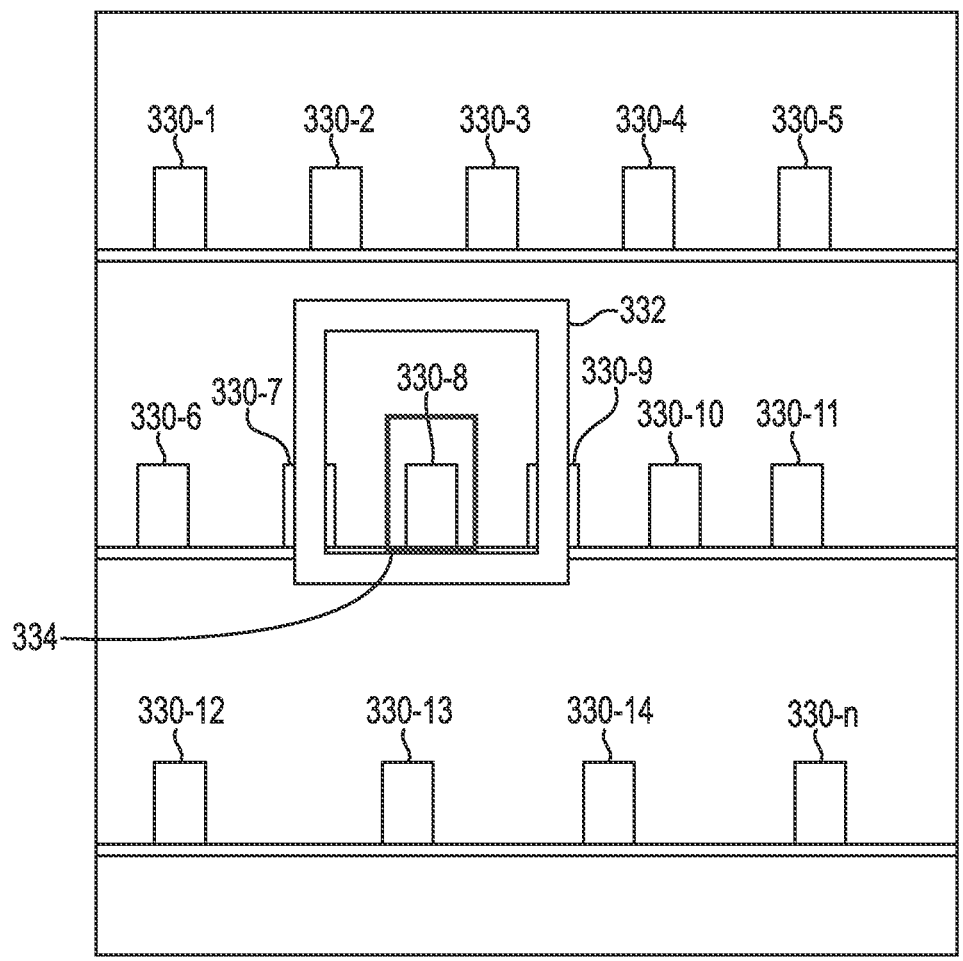
FIG. 3 is diagram including example object location detection in accordance with a number of embodiments of the present disclosure.

FIG. 3 is diagram including example object location detection in accordance with a number of embodiments of the present disclosure. FIG. 3 includes an example device 332 displaying the location of object 330-8 by displaying a box 334 via a user interface of the device 332. While a rectangular box is illustrated in FIG. 3, different highlights may be used to identify a located object such as color highlighting, an arrow, a circle, etc. The box 334 may be displayed via AR, such that the box 334 is displayed as though it is present in the real-world location among the other objects 330-1, 330-2, . . . , 330-n. In the example illustrated in FIG. 3, the objects 330 are displayed on shelves, but may be located in a different arrangement in a different location. The objects 330 may be the same, similar, or different objects. For instance, the objects 300 may include a plurality of laboratory equipment or grocery items, among others.

FIG. 4 is another functional diagram representing a processing resource 452 in communication with a memory resource 450 having instructions written thereon in accordance with a number of embodiments of the present disclosure. The device (e.g., apparatus) illustrated in FIG. 4 can be a server or a computing device (among others) and can include the processing resource 452. The device can further include the memory resource 450 (e.g., a non-transitory MRM), on which may be stored instructions, such as instructions 454, 455, 456, 457, 458, 459, 460, 461, 462. The device, in some examples, may be analogous to location tool 108 and/or the device described with respect to FIG. 5 including processing resources 552 and memory resource 550. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 450 may be electronic, magnetic, optical, or other physical storage device that stores executable instructions. Thus, the memory resource 450 may be, for example, non-volatile or volatile memory. In some examples, the memory resource 450 is a non-transitory MRM comprising RAM, an Electrically-Erasable Programmable ROM (EEPROM), a storage drive, an optical disc, and the like. The memory resource 450 may be disposed within a controller and/or computing device. In this example, the executable 454, 455, 456, 457, 458, 459, 460, 461, 462 can be "installed" on the device. Additionally, and/or alternatively, the memory resource 350 can be a portable, external or remote storage medium, for example, that allows the system to download the instructions 454, 455, 456, 457, 458, 459, 460, 461, 462 from the portable/external/remote storage medium. In this situation, the executable instructions may be part of an "installation package". As described herein, the memory resource 450 can be encoded with executable instructions for object location determination.

The instructions 454, when executed by a processing resource such as the processing resource 452 can include instructions to receive at the processing resource, the memory resource, or both, first image data via first signaling configured to monitor an area. The image data, for instance can include images from a still or moving camera (e.g., mobile device camera) and it may be still images, videos, image sequences, etc. gathered from a camera that can monitor the area to be searched. For instance, the image data can include images, videos, and image sequences of a grocery store, laboratory shelving, or other area to be searched. The image data can be received, in some instances, in real time. In some examples, the image data can be received as previously recorded images, videos, and image sequences.

The instructions 455, when executed by a processing resource such as the processing resource 452 can include instructions to receive at the processing resource, the memory resource, or both, second image data via second signaling configured to retrieve stored images from an image database of a plurality of objects. For instance, images from the image database and/or object feature database can be received for comparison to features of the desired object to be found.

The instructions 456, when executed by a processing resource such as the processing resource 452 can include instructions to receive at the processing resource, the memory resource, or both, a user request to locate a particular object of the plurality of objects via third signaling. For instance, the user may request a particular tool, equipment, food, etc. depending on the location to be searched and the desired object. The third signaling may be received via a device of the user such as a smart device, camera, mobile device, or other computing device.

The instructions 457, when executed by a processing resource such as the processing resource 452 can include instructions to write from the processing resource to the memory resource the first image data, the second image data, and the user request. The instructions 458, when executed by a processing resource such as the processing resource 452 can include instructions to extract, from the second image data, features associated with an image of the particular object from the image database of the plurality of objects. For instance, the image database can include a plurality of images of objects associated with the area to be searched. Features of those objects can be extracted from the image database to create an object feature database that can be used for comparison to objects in the area to be searched that potentially match the desired object requested by the user.

The instructions 459, when executed by a processing resource such as the processing resource 452 can include instructions to compare, at the processing resource, the extracted features to the first image data. For instance, the user may request a flathead screwdriver and scans the area to be searched. The processing resource 452 and/or the memory resource 450 can identify a potential match based on the features extracted from image data in the image database. A comparison can be made between features of the potential match (e.g., screwdriver, metal, flat shape, etc.) and features of the desired flathead screwdriver. The comparison, for instance, can be performed using a machine learning model or model that considers the desired object and associated features and features extracted from the image database.

The instructions 460, when executed by a processing resource such as the processing resource 452 can include instructions to determine, at the processing resource, a confidence level of a location of the particular object in the area using a machine learning model, results of the comparison, the first image data, the second image data, and the user request. Put another way, using the of machine learning model, a probability that the potential matching object is the desired object requested by the user. The probability may be presented as a percentage, for instance, via a display of the user's device. The confidence level can consider several features associated with the object to determine a likelihood of a match. Deviations from the features of the desired objected may indicate a lower confidence level and can be flagged by the machine learning model.

In some examples, the different image data and manual input data carry different weights within the machine learning model (e.g., a trained machine learning model). Similar, results of the comparison, the first image data, the second image data, and the user request can carry different weights within the machine learning model. The weights can change as more data is received and the machine learning models are updated. If more than one machine learning model is used, the machine learning models may carry weights, as well. For instance, different data (e.g., tabular, image, audio, etc.) may be analyzed using different machine learning models appropriate for that data type. A particular type of data, for instance image data, may be given a higher weight than tabular data, meaning the associated image machine learning model may carry a higher weight than a tabular machine learning model, for instance.

In some examples, the machine learning model performs binary or multi-class classification when instances are classified into one of two or more classes. The machine learning model and an object feature database, in some examples, can be updated based on results of the comparison, in response to receipt of user feedback, or both. For instance, based on accuracy of results (e.g., confidence levels above/below a threshold), or a user's opinions on the results, updates can be made.

The instructions 461, when executed by a processing resource such as the processing resource 452 can include instructions to identify, at the first processing resource or the second processing resource, output data representative of the location of the particular object in the area based on the confidence level, and the instructions 462, when executed by a processing resource such as the processing resource 452 can include instructions to transmit the output data representative of the location to the user. For instance, an object may be located with a high enough confidence level, and the location can be transmitted and displayed via AR to the user.

In some examples, the output data representative of the location of the particular object comprises a non-location in response to the confidence level falling below a predetermined threshold. In such an example, a query for additional features of the object can be started. For instance, if a desired object is not located in the searching area, a user can receive feedback that no match was made with a high enough confidence to locate the object. The user may be prompted to further scan the area, move closer to the objects, or other suggestions in an attempt to identify features of the desired object matching with those in the object feature database, and to use those matches to locate the desired object.

FIG. 5 is yet another functional diagram representing a processing resource 552 in communication with a memory resource 550 having instructions 566, 568, 570, 572 written thereon in accordance with a number of embodiments of the present disclosure. In some examples, the processing resource 552 and the memory resource 550 comprise a device and may be analogous to the processing resource 452 and the memory resource 450 illustrated in FIG. 4, and/or location tool 108 illustrated in FIG. 1.

The instructions 566, when executed by a processing resource such as the processing resource 552 can include instructions to receive at the processing resource, the memory resource, or both, a plurality of input data from a plurality of sources, the plurality of sources comprising at least two of: a mobile device of a user, a stationary camera, a camera of the mobile device, an image database, an object feature database, a portion of the memory resource or other storage, and manually received input. For instance, the input data can include a request from a user for a particular object, image data from an image database including image data associated with objects likely to be found in an area to be searched, image data captured by stationary or mobile cameras, image data captured by smart devices, object features stored in an object feature database, etc.

In some examples, a user may use a mobile application to find an object, for instance a box of cereal in a grocery store. The user may access the mobile application, enter a description or keyword of the desired object (e.g., typed input, photo input, audio input, etc.). Based on this request, the image database and/or object feature database can be searched for potential matches and locations of the desired object. The object feature database can be updated in response to users searching for new objects and/or when new features are discovered, which can result in the object feature database increasing in size and improving accuracy over time. The image database and object feature database can also be updated based on trends, for instance. If users are searching for the same objects consistently, a suggestion can be made for organization of the items (e.g., put most-used items on eye-level shelf).

The instructions 568, when executed by a processing resource such as the processing resource 552 can include instructions to write from the processing resource to the memory resource the received plurality of input data, and the instructions 570, when executed by a processing resource such as the processing resource 552 can include instructions to identify, using a plurality of machine learning models, at the processing resource or a different processing resource, output data representative of a location of a particular object requested by the user, based at least in part on input data representative of the data written from the processing resource. For instance, if features of the desired object match features of a potential matching object in the object feature database, a match can be made and communicated to the user. In some examples, a match may not be made, or a match can be made with a lower confidence, and the non-match (or non-location) of the object can be communicated to the user.

In some examples, identification of the output data representative of the location of the particular object can be based at least in part on generic object feature information stored in a portion of the memory resource or other storage accessible by the processing resource. For instance, the image database can include generic images of items that may be in the area to be searched or similar items, allowing for additional features to be extracted to aid in comparisons and accuracy of matches and location determinations.

In some instances, identification of the output data representative of the location of the particular object can include comparing a feature of the particular object to features stored in the object feature database and identifying the particular object with an associated confidence level. The confidence level may be adjusted, for instance, based on the similarity of objects in the area to be searched. For example, if the desired particular object is a specific bottle of wine in a large wine rack, the confidence level may be increased to improve accuracy of the location determination. If the particular object desired is a microscope among other laboratory instruments, the confidence level may be reduced due to different and distinguishing features.

The instructions 572, when executed by a processing resource such as the processing resource 552 can include instructions to transmit the output data representative of the location of the particular object to the user. For instance, in response to the associated confidence level being at or above a threshold, the output data representative of the location of the particular object can be transmitted and displayed via a display of the mobile device. The output data representative of the location of the particular object can be transmitted to the user, in some instances, via AR. For instance, a box may be displayed via AR on a user display around the desired object to direct the user where to find it. In some examples, in response to identifying the location of the particular object, a new feature can be created, and the object feature database can be updated. For instance, if the desired object is red and that feature was not previously in the object feature database, the red feature can be added to improve accuracy.

In response to the associated confidence level falling below the threshold, the output data representative of the location of the particular object can be transmitted and displayed via a display of the mobile device as unknown. For example, if the object is not located in the area and/or it is located, but with a low confidence level, the user may be prompted via the mobile device to add more to their request or move closer to the area to be searched for better results.

Figure 6:
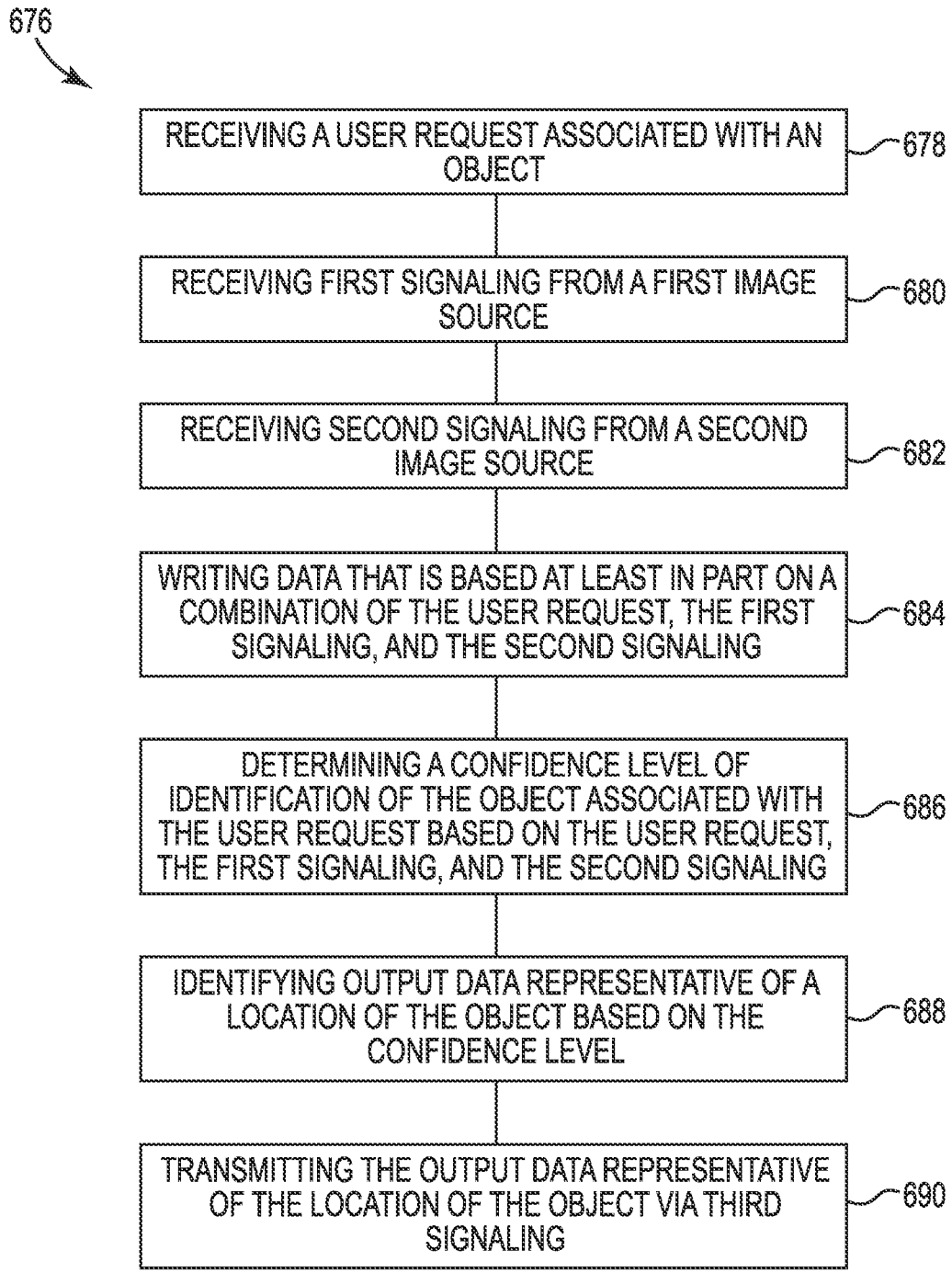
FIG. 6 is another flow diagram representing an example method for object location determination in accordance with a number of embodiments of the present disclosure.

FIG. 6 is another flow diagram representing an example method 676 for object location determination in accordance with a number of embodiments of the present disclosure. The method 676 may be performed, in some examples, using a location tool 108 and/or a device such as those described with respect to FIGS. 4 and 5.

The method 676, at 678, can include receiving, at a first processing resource, a user request associated with an object. A user can request, via a mobile device application or other input method, a particular object among a plurality of similar or different objects. For instance, in a laboratory, the user may request a location of a particular pair of scissors.

At 680, the method 676 can include receiving, at the first processing resource, first signaling from a first image source, and at 682, the method 676 can include receiving, at the first processing resource, second signaling from a second image source. The first image source can include image data from a camera such as a stationary camera (e.g., security camera) or a mobile camera (e.g., smart phone camera). The image data received from the first image source can include still images, videos, image sequences, etc. of objects within the area to be searched for the desired object. The second image source can include an image database that includes image data associated with objects within an area to be searched, such as the aforementioned laboratory.

The method 676, at 684, can include writing from the first processing resource to a memory resource coupled to the first processing resource, data that is based at least in part on a combination of the user request, the first signaling, and the second signaling. The written data can be saved at the memory resource for use in determination of a location of the desired object, for instance. In some examples, the method 676 can include receiving at the first processing resource via an application of a computing device accessible by the user or a different mobile device of the user, manual input from the user comprising object data, object location data, a confidence level threshold, or a combination thereof and writing from the first processing resource to the memory resource coupled to the first processing resource data that is based at least in part on a combination of the first signaling, the second signaling, the user request, and the manual input.

At 686, the method 676 can include determining, at the first processing resource or a different, second processing resource, a confidence level of identification of the object associated with the user request based on the user request, the first signaling, and the second signaling. For example, the closer the match between features in an object feature database associated with a potential matching object are to features of the desired object, the higher the confidence level. The object feature database can include features extracted from the image database.

In some examples, a threshold confidence level can be set such that no location will be provided if the confidence level falls below the threshold (e.g., "no match"). For instance, fourth signaling from the object feature database can be received at the first processing resource, and the confidence level of identification of the desired object can be made based on the user request, the first signaling, the second signaling, and the fourth signaling.

At 688, the method 676 can include identifying, at the first processing resource or the different, second processing resource, output data representative of a location of the object based on the confidence level, and at 690, the method 676 can include transmitting the output data representative of the location of the object via third signaling. For instance, if the confidence level is at or above the threshold based on the comparison between features of the object feature database and the desired object, a location of the object can be displayed to the user, for instance via AR.

In some examples, identifying the output data representative of the location of the object comprises utilizing a plurality of trained machine learning models to identify the output data representative of the location of the object based on data associated with the first signaling, the second signaling, the user request, and previously received signaling and associated data associated with previous requests associated with the object. The trained machine learning models can be updated as new features are identified, user feedback is received, and/or different objects are requested. For instance, the location of the object, confidence level, or both, can be updated in response to receiving at the first processing resource additional first signaling, second signaling, or any combination thereof and based at least in part on feedback received at the first processing resource associated with outcomes of the output data representative of the location of the object.

In some instances, identifying the output data representative of the location of the object comprises identifying a proposed action and associated instructions based on the confidence level. For instance, if the confidence level is at or about a particular threshold, the object can be displayed, for instance via AR, to the user. If the confidence level is below the particular threshold, a proposed action and instructions such as "move closer to the search area", or "add more features" may be provided to the user, for instance via the mobile device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, at a first processing resource, a user request associated with an object;
   receiving, at the first processing resource, first signaling from a first image source;
   receiving, at the first processing resource, second signaling from a second image source;
   writing from the first processing resource to a memory resource coupled to the first processing resource, data that is based at least in part on a combination of the user request, the first signaling, and the second signaling;
   determining, at the first processing resource or a different, second processing resource, a confidence level of identification of the object associated with the user request based on the user request, the first signaling, and the second signaling;
   identifying, at the first processing resource or the different, second processing resource, output data representative of a location of the object based on the confidence level;
   transmitting the output data representative of the location of the object via third signaling;
   displaying, via augmented reality (AR), the location of the object as an avatar displayed within a real-world environment of the user as digital information tailored to the user's physical position and contexts of an associated task; and
   reorganizing the object and additional objects within the area based on the confidence level and the location of the object.

2. The method of claim 1, further comprising:
   receiving, at the first processing resource, fourth signaling from an object feature database; and
   determining, at the first processing resource or the different, second processing resource, the confidence level of identification of the object associated with the user request based on the user request, the first signaling, the second signaling, and the fourth signaling.

3. The method of claim 1, wherein receiving the first signaling from a first image source comprises receiving the first signaling from a stationary camera.

4. The method of claim 1, wherein receiving the first signaling from a first image source comprises receiving the first signaling from a mobile device camera.

5. The method of claim 1, wherein receiving the second signaling from a second image source comprises receiving the second signaling from an image database.

6. The method of claim 1, wherein identifying the output data representative of the location of the object comprises utilizing a plurality of trained machine learning models to identify the output data representative of the location of the object based on data associated with the first signaling, the second signaling, the user request, and previously received signaling and associated data associated with previous requests associated with the object.

7. The method of claim 1, wherein identifying the output data representative of the location of the object comprises identifying a proposed action and associated instructions based on the confidence level.

8. The method of claim 1, further comprising updating the location of the object, confidence level, or both, in response to receiving at the first processing resource additional first signaling, second signaling, or any combination thereof and based at least in part on feedback received at the first processing resource associated with outcomes of the output data representative of the location of the object.

9. The method of claim 1, further comprising:
   receiving at the first processing resource via an application of a computing device accessible by the user or a different mobile device of the user, manual input from the user comprising object data, object location data, a confidence level threshold, or a combination thereof; and
   writing from the first processing resource to the memory resource coupled to the first processing resource data that is based at least in part on a combination of the first signaling, the second signaling, the user request, and the manual input.

10. An apparatus, comprising:
a processing resource; and
a memory resource in communication with the processing resource having instructions executable to:
receive at the processing resource, the memory resource, or both, first image data via first signaling configured to monitor an area;
receive at the processing resource, the memory resource, or both, second image data via second signaling configured to retrieve stored images from an image database of a plurality of objects;
receive at the processing resource, the memory resource, or both, a user request to locate a particular object of the plurality of objects via third signaling;
write from the processing resource to the memory resource the first image data, the second image data, and the user request;
extract, from the second image data, features associated with an image of the particular object from the image database of the plurality of objects;
compare, at the processing resource, the extracted features to the first image data;
determine, at the processing resource, a confidence level of a location of the particular object in the area using a machine learning model, results of the comparison, the first image data, the second image data, and the user request;
identify, at the first processing resource or the second processing resource, output data representative of the location of the particular object in the area based on the confidence level;
transmit the output data representative of the location to the user;
display, via augmented reality (AR), the location of the object as an avatar displayed within a real-world environment of the user as digital information tailored to the user's physical position and contexts of an associated task; and
reorganize the object and additional objects within the area based on the confidence level.

11. The apparatus of claim 10, wherein the machine learning model is configured to perform multi-class classification.

12. The apparatus of claim 10, wherein the results of the comparison, the first image data, the second image data, and the user request carry different weights within the machine learning model.

13. The apparatus of claim 10, wherein the output data representative of the location of the particular object comprises a non-location in response to the confidence level falling below a predetermined threshold.

14. The apparatus of claim 10, further comprising the instructions executable to start a query for additional features of the object in response to the confidence level falling below a predetermined threshold.

15. The apparatus of claim 10, further comprising updating the machine learning model and an object feature database based on results of the comparison, in response to receipt of user feedback, or both.

16. A non-transitory machine-readable medium comprising a processing resource in communication with a memory resource having instructions executable to:
receive at the processing resource, the memory resource, or both, a plurality of input data from a plurality of sources, the plurality of sources comprising at least two of: a mobile device of a user, a stationary camera, a camera of the mobile device, an image database, an object feature database, a portion of the memory resource or other storage, and manually received input;
write from the processing resource to the memory resource the received plurality of input data;
identify, using a plurality of machine learning models, at the processing resource or a different processing resource, output data representative of a location of a particular object requested by the user, based at least in part on input data representative of the data written from the processing resource;
transmit the output data representative of the location of the particular object to the user;
display, via augmented reality (AR), the location of the particular object as an avatar displayed within a real-world environment of the user as digital information tailored to the user's physical position and contexts of an associated task; and
reorganize the particular object and additional objects within the area based on the confidence level.

17. The medium of claim 16, further comprising the instructions executable to identify the output data representative of the location of the particular object based at least in part on generic object feature information stored in a portion of the memory resource or other storage accessible by the processing resource.

18. The medium of claim 16, wherein the instructions executable to identify output data representative of the location of the particular object comprises the instructions executable to:
compare a feature of the particular object to features stored in the object feature database;
identify the particular object with an associated confidence level;
in response to the associated confidence level at or above a threshold, transmit the output data representative of the location of the particular object via a display of the mobile device; and
in response to the associated confidence level falling below the threshold, transmit the output data representative of the location of the particular object via a display of the mobile device as unknown.

19. The medium of claim 16, further comprising instructions executable to create a new feature and update the object feature database in response to identifying the location of the particular object.

20. The medium of claim 16, wherein the context of the associated task comprises determining the location of the particular object and tracking movement of the particular object.

* * * * *